(12) United States Patent
Neelakantan et al.

(10) Patent No.: US 9,187,096 B2
(45) Date of Patent: Nov. 17, 2015

(54) ROLLING AND REGULAR GARAGE SHIFTS IN NEW REAR WHEEL DRIVE POWERFLOWS

(75) Inventors: Vijay A. Neelakantan, Rochester Hills, MI (US); Kevin Michael Dougan, Plymouth, MI (US)

(73) Assignee: GM Global Technology Operations LLC, Detroit, MI (US)

(*) Notice: Subject to any disclaimer, the term of this patent is extended or adjusted under 35 U.S.C. 154(b) by 623 days.

(21) Appl. No.: 13/590,539

(22) Filed: Aug. 21, 2012

(65) Prior Publication Data
US 2013/0263683 A1 Oct. 10, 2013

Related U.S. Application Data

(60) Provisional application No. 61/620,300, filed on Apr. 4, 2012.

(51) Int. Cl.
| | |
|---|---|
| *F16H 3/00* | (2006.01) |
| *B60W 30/18* | (2012.01) |
| *F16H 61/02* | (2006.01) |
| *B60W 10/06* | (2006.01) |
| *B60W 10/11* | (2012.01) |

(52) U.S. Cl.
CPC ..... *B60W 30/18045* (2013.01); *F16H 61/0246* (2013.01); *B60W 10/06* (2013.01); *B60W 10/11* (2013.01); *F16H 2312/08* (2013.01); *Y10T 74/19251* (2015.01)

(58) Field of Classification Search
CPC .......................... F16H 1/0246; B60K 30/8045
See application file for complete search history.

(56) References Cited

U.S. PATENT DOCUMENTS

| | | | |
|---|---|---|---|
| 2004/0266584 A1* | 12/2004 | Janson et al. | 477/79 |
| 2010/0130323 A1* | 5/2010 | Gumpoltsberger | 475/59 |

* cited by examiner

*Primary Examiner* — Derek D Knight

(57) ABSTRACT

A system for controlling a transmission of a vehicle includes an engine control module that generates a command, while the vehicle is rolling in either a forward or reverse direction, to change a transmission of the vehicle from a reverse drive gear to a forward drive gear. The transmission includes a first clutch, a second clutch, a third clutch, and a fourth clutch. A transmission control module, in response to the command, maintains a first clutch in an engaged state, releases a second clutch and a fourth clutch, with the first clutch in the engaged state and the second clutch and the fourth clutch released, applies a third clutch with a synchronizer to engage the third clutch, and, after the third clutch is engaged, reapplies the fourth clutch to engage the fourth clutch.

16 Claims, 3 Drawing Sheets

ROLLING AND REGULAR GARAGE SHIFTS IN NEW REAR WHEEL DRIVE POWERFLOWS

CROSS-REFERENCE TO RELATED APPLICATIONS

This application claims the benefit of U.S. Provisional Application No. 61/620,300, filed on Apr. 4, 2012. The disclosure of the above application is incorporated herein by reference in its entirety.

FIELD

The present disclosure relates to executing rolling and regular garage shifts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle having an automatic or manual transmission may execute a garage shift. A garage shift includes a shift from park or neutral to forward or reverse. Under certain conditions, a garage shift may cause torque driveline disturbance.

SUMMARY

A system for controlling a transmission of a vehicle includes an engine control module that generates a command, while the vehicle is rolling in either a forward or reverse direction, to change a transmission of the vehicle from a reverse drive gear to a forward drive gear. The transmission includes a first clutch, a second clutch, a third clutch, and a fourth clutch. A transmission control module, in response to the command, maintains a first clutch in an engaged state, releases a second clutch and a fourth clutch, with the first clutch in the engaged state and the second clutch and the fourth clutch released, applies a third clutch with a synchronizer to engage the third clutch, and, after the third clutch is engaged, reapplies the fourth clutch to engage the fourth clutch.

A method for controlling a transmission of a vehicle includes generating a command, while the vehicle is rolling in either a forward or reverse direction, to change a transmission of the vehicle from a reverse drive gear to a forward drive gear. The transmission includes a first clutch, a second clutch, a third clutch, and a fourth clutch. The method further includes, in response to the command, maintaining a first clutch in an engaged state, releasing a second clutch and a fourth clutch, with the first clutch in the engaged state and the second clutch and the fourth clutch released, applying a third clutch with a synchronizer to engage the third clutch, and, after the third clutch is engaged, reapplying the fourth clutch to engage the fourth clutch.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A driver may attempt to execute a rolling or regular garage shift of a vehicle having an automatic or manual transmission. In a rolling garage shift, the vehicle may be in neutral while travelling (i.e., rolling) in either a forward or reverse direction. Or, the vehicle may be transitioning from reverse to a forward drive gear while still rolling backward. Shifting the vehicle in this manner (e.g., from reverse or neutral, while rolling backward, to a forward drive gear) may cause torque driveline disturbance.

The transmission may include a high gain element such as a dog clutch, which is associated with smaller packaging, reduced spin loss, and improved fuel economy. However, engagement of the dog clutch may be limited to situations where a slip speed across the dog clutch is approximately zero. Accordingly, engaging the dog clutch during garage shifts may be limited.

A transmission control system according to the present disclosure includes a synchronizing clutch element that is engaged during garage shifts to reduce the slip speed across the dog clutch to zero. Further, the transmission control system may transition the vehicle from reverse to neutral, use the synchronizing clutch element to engage the dog clutch, and then apply a clutch required to complete the garage shift.

Figure 1:
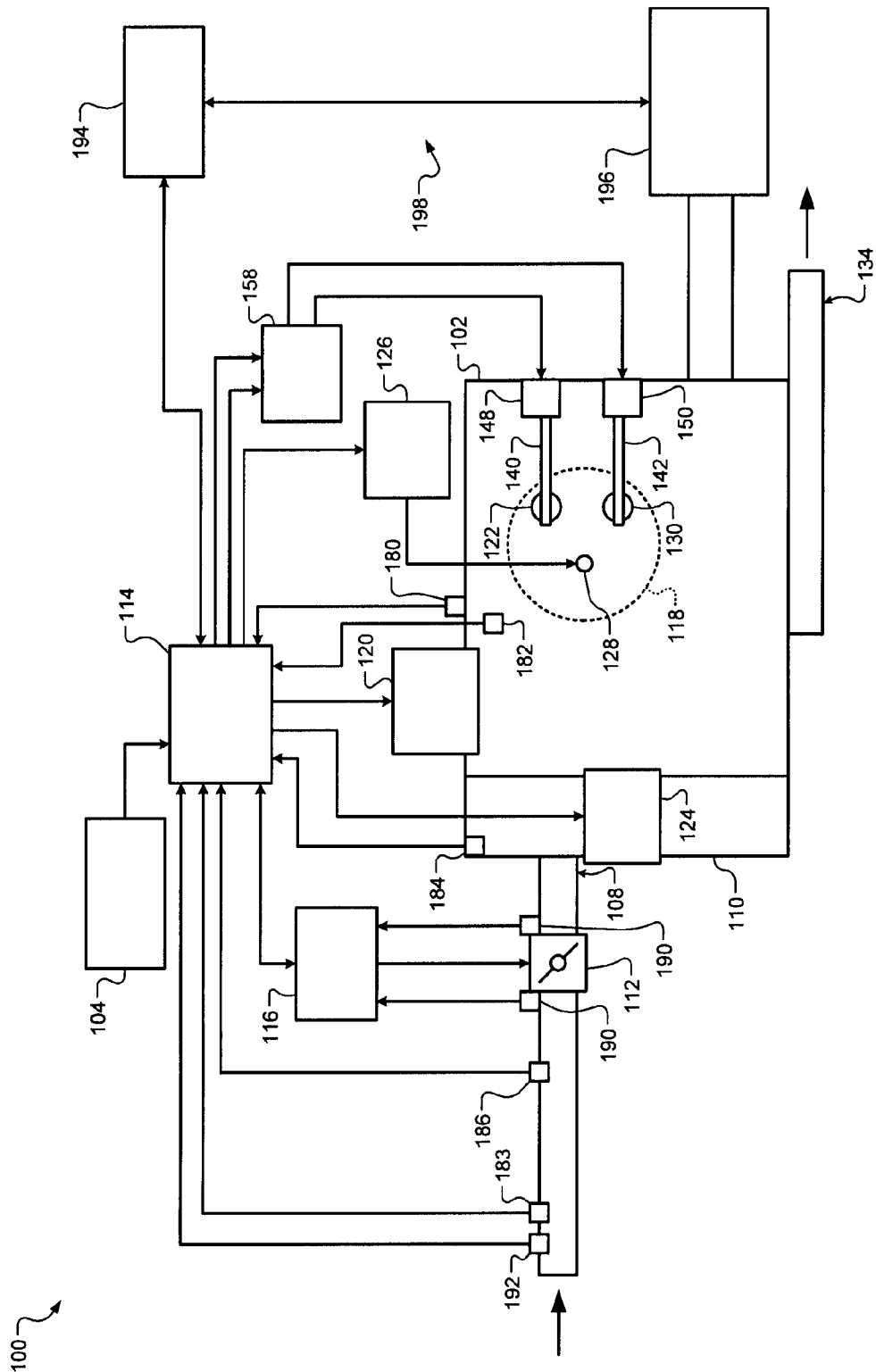
FIG. 1 is a functional block diagram of an engine system including a transmission control system according to the principles of the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may measure the position of the crankshaft using a crankshaft position (CKP) sensor 180. The ECM 114 may use the crankshaft position to calculate engine speed in, for example, revolutions per minute (rpm). The temperature of the engine coolant may be measured using an engine coolant temperature (ECT) sensor 182. The ECT sensor 182 may be located within the engine 102 or at other locations where the coolant is circulated, such as a radiator (not shown).

Atmospheric pressure may be measured using an atmospheric pressure (ATM) sensor 183. The pressure within the intake manifold 110 may be measured using a manifold absolute pressure (MAP) sensor 184. In various implementations, engine vacuum, which is the difference between the ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module (TCM) 194 to coordinate shifting gears in a transmission 196. For example, the ECM 114 may reduce engine torque during a gear shift. Although not shown, if the engine system 100 is implemented in a hybrid electric vehicle, the ECM 114 may communicate with a hybrid control module to coordinate operation of the engine 102 and an electric motor.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

A transmission control system 198 includes the transmission control module 194 and the transmission 196 of the vehicle. The transmission 196 includes a plurality of friction elements such as clutches that are selectively engaged (i.e., engaged and disengaged) to drive the vehicle in a forward or reverse direction. For example, certain clutches may be engaged only when the vehicle is travelling in a forward direction and are disengaged when the vehicle is travelling in a reverse direction. One or more other clutches may be engaged only when the vehicle is travelling in a reverse direction and are disengaged when the vehicle is travelling in a forward direction. Other clutches may be selectively engaged in both the forward and reverse directions.

The transmission 196 is responsive to commands from the transmission control module 194. The transmission control module 194 may monitor the transmission 196 and other characteristics of the vehicle and control the transmission 108 accordingly. For example, the transmission control module 194 may receive commands or monitored characteristics from the driver (e.g., a command to change gears via the ECM 114), the transmission 196, and/or other components of the vehicle. The transmission control module 194 commands the transmission 196 to transition between various forward and reverse gear ratios according to the commands and monitored characteristics.

The transmission control module 194 may command the transmission 108 to execute a garage shift (e.g., a rolling garage shift) in response to a command from the driver (e.g., a command to transition from a reverse or neutral gear ratio to a forward gear ratio (i.e., drive) while the vehicle is rolling backward). To execute the rolling the garage shift, the transmission 196 may maintain one or more first clutches (e.g., keep a first clutch engaged), release one or more second clutches (e.g., release a second clutch), and apply a third clutch (e.g., engage a dog clutch with a syncrhonizer), and release and then reapply a fourth clutch.

For example, when the vehicle is in reverse, the first, second, and fourth clutches may be engaged. In response to a command to transition from reverse to drive, the transmission control module 194 commands the transmission 196 to maintain the first clutch, which may correspond to a clutch that is maintained during reverse, neutral, and drive gear ratios of the vehicle. The transmission control module 194 commands the transmission 196 to release the second clutch, which corresponds to a clutch that is only applied while the vehicle is in reverse.

The transmission control module 194 commands the transmission 196 to release (e.g., partially or substantially), the fourth clutch. For example only, the fourth clutch is released to a point where the clutch just beings to make frictional contact (e.g., a kiss-point of the clutch). Specifically, the fourth clutch may be released so that the dog clutch may be engaged with a synchronizer while maintaining the vehicle state in neutral. The fourth clutch may correspond to a clutch that is normally maintained while the vehicle is in drive. However, instead of being maintained during the rolling garage shift, the fourth clutch element is released according to the principles of the present disclosure. For example, with the second clutch and the fourth clutch released, the vehicle may be in neutral. With the fourth clutch element released (and the vehicle in neutral), the transmission control module 194 commands the transmission 196 to apply the third clutch, which corresponds to the dog clutch with a synchronizer according to the principles of the present disclosure. Accordingly, the dog clutch is engaged with minimal slip speed.

After the dog clutch is engaged, the fourth clutch element is reapplied. For example, the transmission control module 194 may command the transmission 196 to apply the fourth clutch element a predetermined time after commanding the transmission 196 to apply the dog clutch. Or, the transmission 196 may include a position sensor that senses when the dog clutch is fully engaged. The transmission control module 196 determines when the dog clutch is fully engaged based on a signal from the position sensor and commands the transmission 196 to apply the fourth clutch element accordingly.

Figure 2:
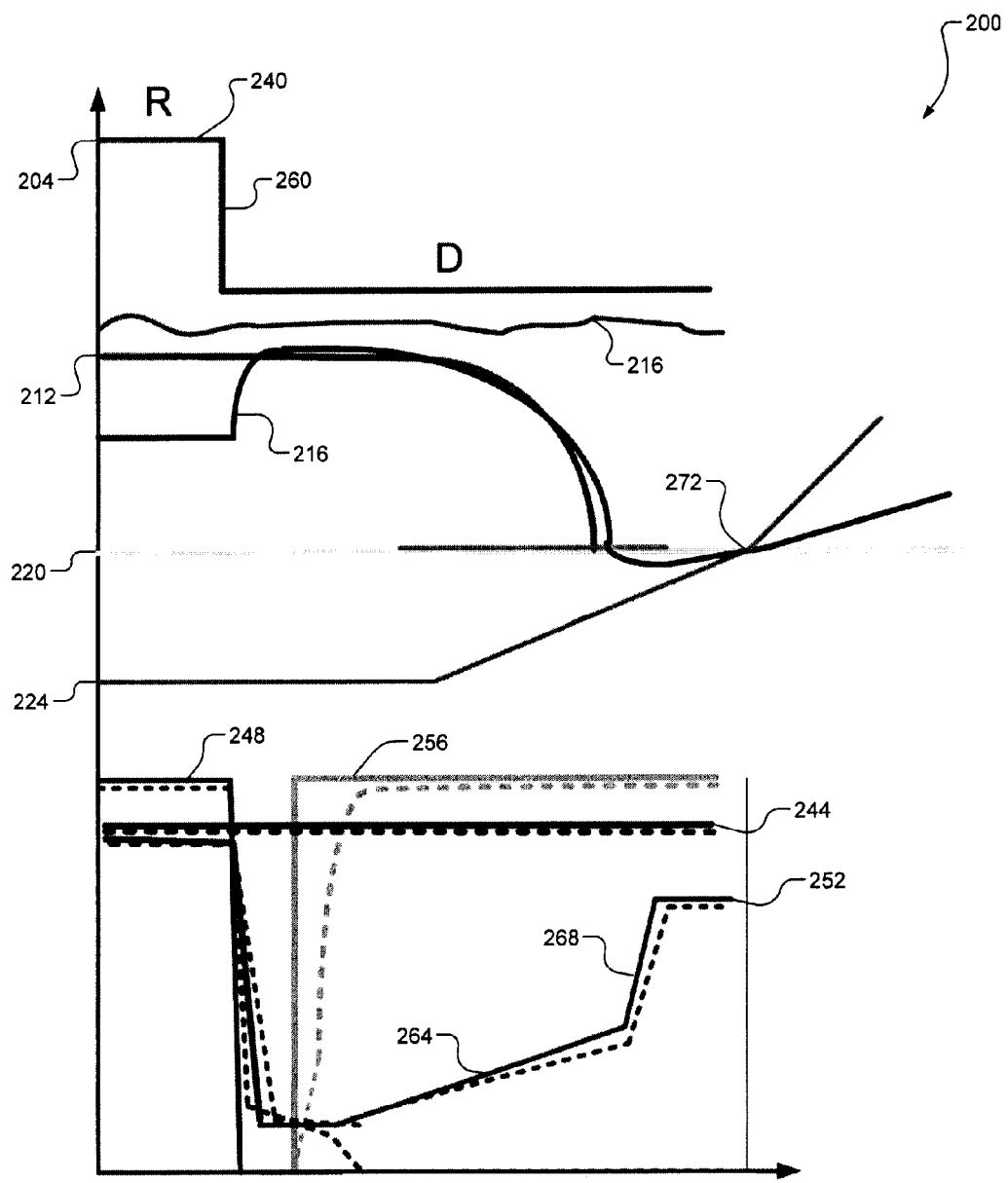
FIG. 2 is a timing diagram that illustrates clutch engagement with respect to a commanded gear, engine speed, turbine speed, and vehicle speed according to the principles of the present disclosure.

Referring now to FIG. 2, a timing diagram 200 illustrates clutch engagement with respect to a commanded gear 204, engine speed 208, a commanded turbine speed 212 and an actual turbine speed 216, a zero speed line 220, and a vehicle speed 224. When the vehicle is in reverse as shown at 240, a first clutch 244, a second clutch 248, and a fourth clutch 252 are applied. For example only, the first clutch 244 corresponds to a clutch that is maintained during reverse, neutral, and drive gear ratios of the vehicle. The second clutch 248 corresponds to a clutch that is only applied while the vehicle is in reverse. The fourth clutch 252 corresponds to a clutch that is normally maintained while the vehicle is in drive, but corresponds to the synchronizing clutch element according to the principles of the present disclosure. A third clutch 256 is a dog clutch with a synchronizer and is disengaged. The commanded turbine speed 212 and the actual turbine speed are greater than the zero speed line 220 and correspond to the negative vehicle speed 224 while the vehicle is in reverse.

The commanded gear 204 transitions from reverse to drive at 260. The first clutch 244 is maintained, while the second clutch 248 and the fourth clutch 252 are released. For example only, the fourth clutch 252 is released to a kiss-point of the fourth clutch 252. With the clutches 248 and 252 released, the actual turbine speed 216 begins to increase. The third clutch 256 (i.e., the dog clutch with a synchronizer) is applied to reduce the slip speed and to lock the dog teeth in response to the command to transition from reverse to drive. For example, the disengagement of the fourth clutch 252 to the kiss-point allows the third clutch 256 to be engaged while maintaining a neutral drive state.

With the third clutch 256 fully applied, the fourth clutch 252 is reapplied. Initially, the fourth clutch 252 is applied at a first, lower rate as shown at 264 to execute the rolling garage shift. As the fourth clutch 252 is increasingly applied, the turbine speed 216 decreases as the vehicle speed 224 decreases and begins to approach the zero speed line 220. When the turbine speed 216 reaches approximately the zero speed line 220, the fourth clutch 252 is applied at a greater rate as shown at 268, and the vehicle speed 224 transitions from the negative (i.e., reverse) direction to a positive (i.e., forward) direction at 272. Accordingly, during the rolling gear shift, the engine speed 208 is relatively stable from the perspective of the driver due to the release of the fourth clutch 252 to the kiss-point and the application of the third clutch 256.

Figure 3:
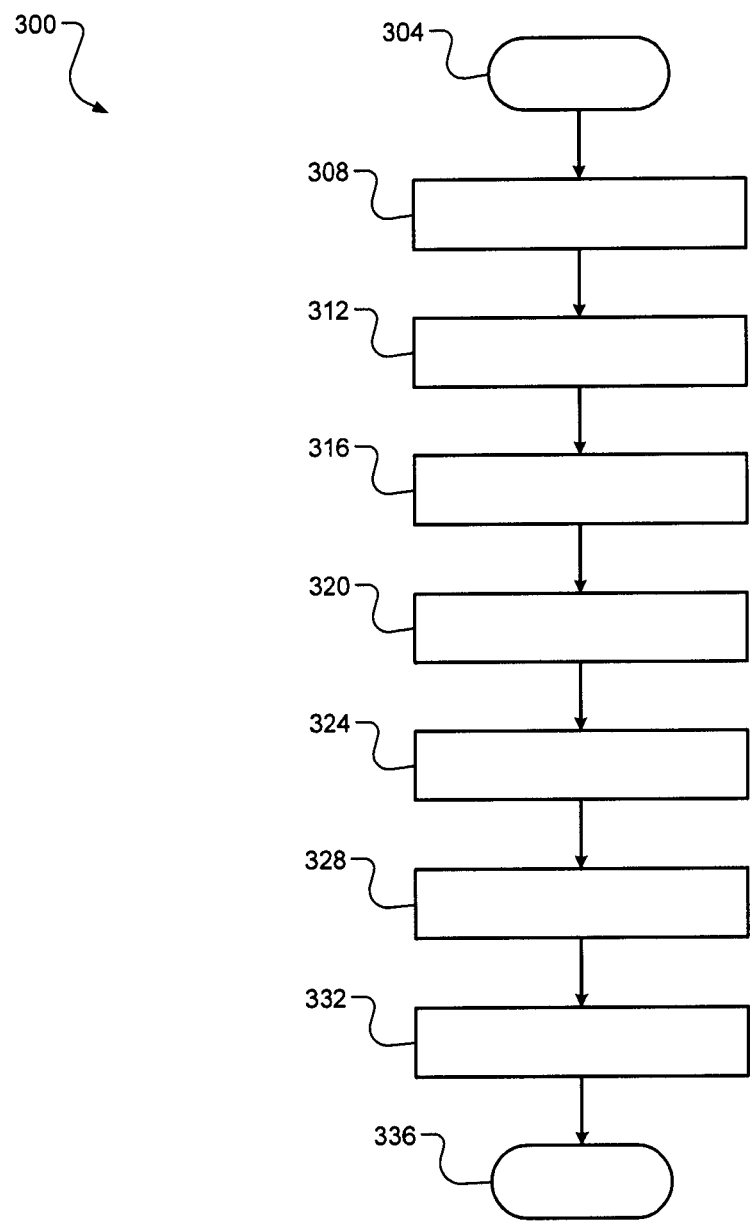
FIG. 3 illustrates a transmission control method according to the principles of the present disclosure.

Referring now to FIG. 3, a transmission control method 300 begins at 304. At 308, the method 300 receives a command to execute a rolling garage shift (e.g., a shift from reverse to drive while the vehicle is still rolling backward). At 312, the method 300 maintains a first clutch and releases second and fourth clutches. At 316, the method 300 applies a dog clutch with a synchronizer. At 320, the method 300 reapplies the fourth clutch at a first rate. At 324, the method 300 determines that turbine speed is less than or equal to a threshold (e.g., 0). At 328, the method 300 applies the fourth clutch at a second rate greater than the first rate. At 332, the vehicle speed transitions from a negative (i.e., reverse) direction to a positive (i.e., forward) direction. The method 300 ends at 336.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for controlling a transmission of a vehicle, the transmission including a first clutch, a second clutch, a third clutch, and a fourth clutch, the system comprising:
    an engine control module that generates a command, while the vehicle is rolling in either a forward or reverse direction, to change a transmission of the vehicle from a reverse drive gear to a forward drive gear; and
    a transmission control module that, in response to the command to change the transmission of the vehicle from the reverse drive gear to the forward drive gear:
        maintains the first clutch in an engaged state;
        releases the second clutch and the fourth clutch;
        with the first clutch in the engaged state and the second clutch and the fourth clutch released, applies the third clutch with a synchronizer to engage the third clutch; and
        after the third clutch is engaged, reapplies the fourth clutch to engage the fourth clutch and change the transmission of the vehicle from the reverse drive gear to the forward drive gear,
        wherein the second clutch is engaged only in the reverse drive gear and is not engaged in any forward drive gear.

2. The system of claim 1, wherein the first clutch is engaged in each of a neutral gear, the reverse drive gear, and the forward drive gear.

3. The system of claim 1, wherein the fourth clutch is engaged in both the reverse drive gear and the forward drive gear.

4. The system of claim 1, wherein the third clutch includes a dog clutch.

5. The system of claim 1, wherein releasing the fourth clutch includes only partially releasing the fourth clutch in response to the command before reapplying the fourth clutch.

6. The system of claim 1, wherein the transmission control module reapplies the fourth clutch a predetermined time after the third clutch is engaged.

7. The system of claim 1, wherein the transmission control module reapplies the fourth clutch based on a position of the third clutch.

8. A system for controlling a transmission of a vehicle, the transmission including a first clutch, a second clutch, a third clutch, and a fourth clutch, the system comprising:
    an engine control module that generates a command, while the vehicle is rolling in either a forward or reverse direction, to change a transmission of the vehicle from a reverse drive gear to a forward drive gear; and
    a transmission control module that, in response to the command to change the transmission of the vehicle from the reverse drive gear to the forward drive gear:
        maintains the first clutch in an engaged state;
        releases the second clutch and the fourth clutch;
        with the first clutch in the engaged state and the second clutch and the fourth clutch released, applies the third clutch with a synchronizer to engage the third clutch; and
        after the third clutch is engaged, reapplies the fourth clutch to engage the fourth clutch and change the transmission of the vehicle from the reverse drive gear to the forward drive gear,
        wherein reapplying the fourth clutch includes reapplying the fourth clutch at a first rate, determining whether a turbine speed is greater than or equal to a threshold, and reapplying the fourth clutch at a second rate that is greater than the first rate when the turbine speed is greater than or equal to the threshold.

9. A method for controlling a transmission of a vehicle, the transmission including a first clutch, a second clutch, a third clutch, and a fourth clutch, the method comprising:
    generating a command, while the vehicle is rolling in either a forward or reverse direction, to change a transmission of the vehicle from a reverse drive gear to a forward drive gear;
    in response to the command to change the transmission of the vehicle from the reverse drive gear to the forward drive gear:
        maintaining a first clutch in an engaged state;
        releasing a second clutch and a fourth clutch;
        with the first clutch in the engaged state and the second clutch and the fourth clutch released, applying a third clutch with a synchronizer to engage the third clutch; and
        after the third clutch is engaged, reapplying the fourth clutch to engage the fourth clutch and change the transmission of the vehicle from the reverse drive gear to the forward drive gear; and
    engaging the second clutch only in the reverse drive gear and not engaging the second clutch in any forward drive gear.

10. The method of claim 9, further comprising engaging the first clutch in each of a neutral gear, the reverse drive gear, and the forward drive gear.

11. The method of claim 9, further comprising engaging the fourth clutch in both the reverse drive gear and the forward drive gear.

12. The method of claim 9, wherein the third clutch includes a dog clutch.

13. The method of claim 9, wherein releasing the fourth clutch includes only partially releasing the fourth clutch in response to the command before reapplying the fourth clutch.

14. The method of claim 9, wherein reapplying the fourth clutch including reapplying the fourth clutch a predetermined time after the third clutch is engaged.

15. The method of claim 9, wherein reapplying the fourth clutch includes reapplying the fourth clutch based on a position of the third clutch.

16. A method for controlling a transmission of a vehicle, the transmission including a first clutch, a second clutch, a third clutch, and a fourth clutch, the method comprising:

generating a command, while the vehicle is rolling in either a forward or reverse direction, to change a transmission of the vehicle from a reverse drive gear to a forward drive gear; and in response to the command to change the transmission of the vehicle from the reverse drive gear to the forward drive gear:

maintaining a first clutch in an engaged state;

releasing a second clutch and a fourth clutch;

with the first clutch in the engaged state and the second clutch and the fourth clutch released, applying a third clutch with a synchronizer to engage the third clutch; and after the third clutch is engaged, reapplying the fourth clutch to engage the fourth clutch and change the transmission of the vehicle from the reverse drive gear to the forward drive gear, wherein reapplying the fourth clutch includes reapplying the fourth clutch at a first rate, determining whether a turbine speed is greater than or equal to a threshold, and reapplying the fourth clutch at a second rate that is greater than the first rate when the turbine speed is greater than or equal to the threshold.

* * * * *